May 23, 1939.  E. J. LAUGAUDIN  2,159,855
SHOCK ABSORBER
Original Filed July 17, 1935
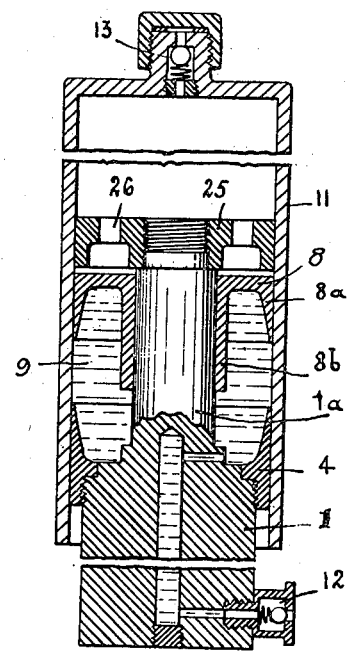
E. J. Laugaudin
Inventor
By: Glascock Downing & Seebold
Attys.

Patented May 23, 1939

2,159,855

UNITED STATES PATENT OFFICE 2,159,855

SHOCK ABSORBER

Eugene Jules Laugaudin, Paris, France

Original application July 17, 1935, Serial No. 31,912. Divided and this application August 11, 1937, Serial No. 158,584. In France July 18, 1934

3 Claims. (Cl. 267—64)

The present invention relates to improvements in shock absorbers applicable to all land and aerial vehicles and is also adaptable to other industrial uses.

In my patent specification numbered 31,912, filed July 17, 1935, of which this application is a division, I have described a shock absorber providing essentially a cylinder containing a compressed gaseous fluid in which a piston moves under the action of shocks and compresses the gaseous fluid in the cylinder; the main piston being combined with a loose piston receiving the pressure of the compressed gaseous fluid and reacting on a liquid placed between the main piston and the loose piston, which liquid transmits the pressure received to packings comprising cups with tapered edges which come in close contact, either with the inside wall of the cylinder, or the outside wall of the piston so as to provide a fluid-proofed joint.

The present invention consists in an improved shock absorber comprising a cylinder and main piston, a second piston displaceable within said cylinder and adapted to separate a mass of liquid and a mass of gaseous fluid contained in said cylinder, sealing means forming opposed flexible members having tapering scraping skirts spacedly arranged and between which is located the liquid, said scraping skirts being respectively secured with said pistons whereby as the result of pressure solely exerted by the gaseous fluid on the second piston and transmitted to the liquid said scraping skirts are pressed closely against the cylinder.

The annexed drawing shows the improved construction by way of example.

The single figure is a vertical section of the shock absorber.

As may be seen on the drawing, this construction is provided by a cylinder 11 in which is located a compressed gaseous fluid, compressed air for instance, which is blown in through the valve 13; in this cylinder, a main piston can move under the action of the shocks, which piston can be constituted in the following manner: the piston rod 1 is provided at its top portion with a screwthread on which the packing cup 4 is screwed; this cup with tapered edge forming a scraper is made of any suitable material and namely of elastic metal.

The piston is extended by a cylindrical part 1a; on this cylindrical part is engaged the loose piston 8 which bears at its centre a sleeve 8b for its guidance in its movement along the cylindrical extension 1a of the piston; on the other hand, this loose piston is provided with a tapered edge 8a which forms a scraping cup along the inside wall of the cylinder, the tapered edges 4 and 8a facing each other.

It will be noticed that the sleeve 8b is of greater length than the tapered part of the cup itself, so as to prevent the tapered edges of the two cups from coming into contact with each other when insufficient oil is located between the two cups, as these contacts would damage the tapered edges of the cups.

On the end part of the piston extension 1a is fixed a disc 25 which acts as a guide to secure a perfect centralisation of the piston assembly in the cylinder; this disc is pierced with holes 26 to allow the compressed gaseous fluid to act on the loose piston 8. 12 is the admission valve of the liquid fluid, oil for instance, which is supplied through the conduit 12a to the chamber 9.

The working operation is as follows:

The compressed air contained in the cylinder 11 is over-compressed under the action of the shocks received by the rod 1; the pressure thus created acts directly on the loose piston 8 and on the oil of the chamber 9, in these conditions, under the action of this pressure, the tapered edges 4 and 8a are pressed into contact with the inside wall of the cylinder, securing a perfect joint.

It is to be noted that in this construction the cups 4 and 8a of which the edges are facing each other, are both moving along the wall of the cylinder, one acting rigidly with rod 1, whereas the other 8a, acting with the loose piston 8, moves relatively to the other cup; moreover, the guidance of the loose piston through the sleeve 8b secures a correct run of the said loose piston which cannot take any inclination whatsoever.

I claim:

1. An improved shock absorber comprising a cylinder and main piston, a second piston displaceable within said cylinder and adapted to separate a mass of liquid and a mass of gaseous fluid contained in said cylinder, sealing means forming opposed flexible members having tapering scraping skirts spacedly arranged and between which is located the liquid, said scraping skirts being respectively secured with said pistons whereby as a result of pressure solely exerted by the gaseous fluid on the second piston and transmitted to the liquid said scraping skirts are pressed closely against the cylinder, the skirt on the main piston being interposed between the latter and the cylinder, the main piston having an extension interconnecting it with the second piston and upon which extension the second piston and its skirt are displaceable.

2. An improved shock absorber comprising a cylinder, a main piston having an extension, a second piston displaceable within said cylinder and adapted to separate a mass of liquid and a mass of gaseous fluid contained in said cylinder, sealing means forming opposed flexible members having tapering scraping skirts spacedly arranged and between which is located the liquid, said scraping skirts being respectively secured with said pistons whereby as a result of pressure solely exerted by the gaseous fluid on the second piston and transmitted to the liquid said scraping skirts are pressed closely against the cylinder, the second piston having a guide sleeve along the extension of the main piston.

3. An improved shock absorber comprising a cylinder, a main piston having an extension, a second piston displaceable within said cylinder and adapted to separate a mass of liquid and a mass of gaseous fluid contained in said cylinder, sealing means forming opposed flexible members having tapering scraping skirts spacedly arranged and between which is located the liquid, said scraping skirts being respectively secured with said pistons whereby as a result of pressure solely exerted by the gaseous fluid on the second piston and transmitted to the liquid said scraping skirts are pressed closely against the cylinder, and a perforated disc fixed to the extension of the main piston which secures centralisation of the assembly.

EUGENE JULES LAUGAUDIN.